Dec. 10, 1963   V. COTMAN, JR   3,113,595
PIPE SUPPORT
Filed Aug. 1, 1960
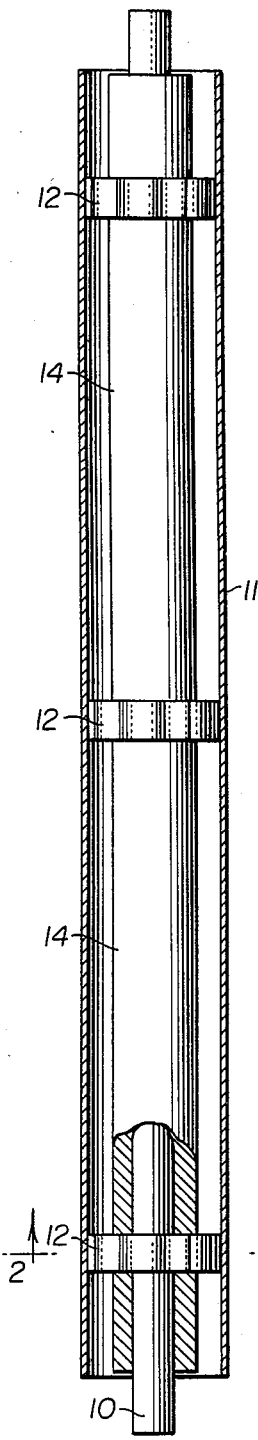
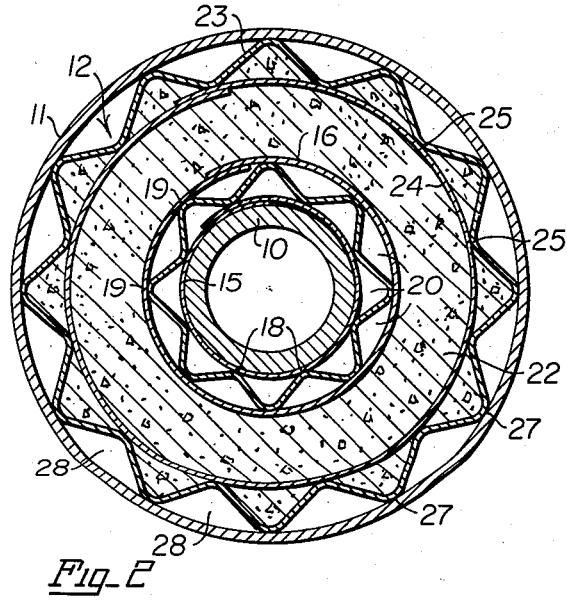
Fig. 2
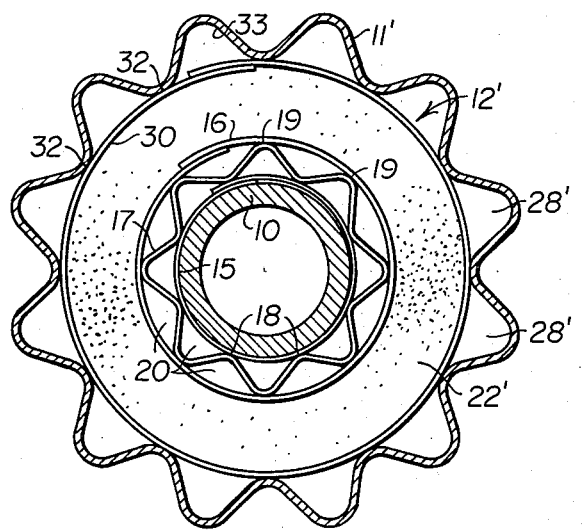
Fig. 3
Fig. 1
INVENTOR.
VAL COTMAN, JR.
BY
Watts, Edgerton, Pyle & Fisher
attys.

United States Patent Office 3,113,595
Patented Dec. 10, 1963

3,113,595
PIPE SUPPORT
Val Cotman, Jr., North Olmsted, Ohio, assignor, by mesne assignments, to Ric-Wil Incorporated, Barberton, Ohio, a corporation of Ohio
Filed Aug. 1, 1960, Ser. No. 46,713
4 Claims. (Cl. 138—113)

This invention pertains to conduit systems and more particularly to a pipe support for maintaining pipes in conduit systems in spaced relationship with surrounding casings.

In the United States Patent No. 2,903,017, a pipe support for maintaining a pipe in spaced insulated relationship with a surrounding casing is shown. According to the teaching of that patent, a plurality of supports are provided at spaced locations within the casing. Each of the supports has at least one hole through it. Each of the supports surrounds an insulated pipe and the support wall defining the hole is in supporting abutment with the pipe.

Each of the supports of the referenced patent includes an inner band which defines the hole, a surrounding ring of filling and insulating material, and an outer corrugated band. Each of the supports also has a reinforcing ring embedded in the filling material and fixed to the outer corrugated band at spaced locations. The outer extremities of the corrugation are in supporting abutment with the outer casing at spaced locations to locate the support and pipe in the casing. The corrugations between such abutments with the casing define air insulating cavities.

The present invention is an improvement over the support taught in the referenced patent. This invention provides a series of insulating air passages between the pipe and the ring of filling material. These passages are substantially contiguous to one another to provide the effect of an annular air space between the filling material and the pipe being supported.

The air spaces adjacent the pipe are obtained by providing a corrugated strip adjacent the pipe. The corrugated strip is reinforced at its inner and outer peripheral limits by a pair of spaced and concentric reinforcing bands which are fixed to the corrugated strips. With this construction, a very thin corrugated supporting strip with substantially only line contact with the reinforcing bands can be used. The bands are held in pipe-supporting, spaced relationship by the corrugated member. Since the corrugated member is made of extremely thin, lightweight material, the conduction of heat from the pipe outwardly is minimized.

The effect of this new construction is to provide substantially an annular layer of insulating air around the pipe and between the pipe and the ring of filling material. This permits hotter materials to be passed through the pipe without damage to the filling material and conversely permits less-expensive, simpler-to-handle filling materials to be used. Additionally, since the annular space provided by this construction has a lower heat conductivity than any filling material available, the support of this invention better insulates the casing from the pipe than prior known supports and a more efficient system is obtained.

Accordingly, one of the principal objects of the invention is to provide a novel and improved pipe support which support includes a series of air passages substantially contiguous to one another and arranged to provide an annular air space around the pipe.

A related object is to provide a support which provides an annular ring of insulating air around the pipe and additional insulating air spaced between the support and the outer surrounding casing so that insulating air substantially surrounds the filling material.

Another object of the invention is to provide a novel and improved pipe support in which a pair of spaced annular bands are held in spaced relationship by a thin corrugated member secured to the bands to provide a substantially annular insulating ring of air around the supported pipe and in which a ring of insulating material surrounds the bands.

Other objects and a full understanding of the invention may be had by referring to the following description and claims taken in conjunction with the accompanying drawings, in which:

FIGURE 1 is a sectional view of a unit length of a conduit system incorporating the novel and improved pipe support;

FIGURE 2 is a sectional view as seen from the plane indicated by the line 2—2 of FIGURE 1 of one of the novel and improved supports; and, FIGURE 3 is a view corresponding to FIGURE 2 of a modified version of the invention.

Referring now to the drawings, a through fluid conducting pipe 10 is provided. The pipe 10 in the disclosed arrangement is disposed within and concentric to an outer casing 11. A plurality of circular pipe supports 12 are disposed within the casing 11. Each of the supports 12 circumscribes the pipe 10. The supports 12 are spaced from one another, FIGURE 1. The portions of the pipe 10 between adjacent pairs of supports 12 are covered by sleeves 14 of a suitable insulating material. The sleeves 14 may, for example, be fiberglass tubes which extend from one support 12 to the next support.

As is best seen in FIGURE 2, each support 12 includes an inner endless band 15. The inner band 15 is an annular member which circumscribes the pipe 10. The inner wall of the band 15 is in supporting abutment with the outer abutment surface of the pipe 10. A second and intermediate endless band 16 is concentrically disposed about the inner band 15. A corrugated band support member 17 is disposed between the bands 15, 16. The inner peripheral extremities of the band support member 17 are united at 18 to the inner band 15. This uniting may be obtained by spot welding or the like but it is confined, in each case, to substantially a line contact between the member 17 and the inner band 15. Similarly, the outer peripheral extremities of the support member 17 are united at spaced locations 19 to the second and intermediate band 16. Just as with the inner band 15, each uniting of a peripheral extremity of the support member 17 to the band 16 is substantially a line contact to minimize heat conductivity.

With the described band and support construction a series of through air passages 20 is defined by the bands 15, 16 and the support member 17. The passages 20 are, since the support member 17 is a very thin sheet member, substantially contiguous. Together they define essentially an annular air space between the bands 15, 16.

A ring 22 of insulating pipe-supporting filler material, such as specially formulated and processed insulating and aggregate concrete, surrounds the intermediate band 16 to support the band 16 and the included pipe 10.

The ring 22 is surrounded by a reinforcing ring means, and in FIGURE 2 this reinforcing ring means comprises an outer corrugated band 23, and a reinforcing ring 24. The reinforcing ring 24 is an annulus which is embedded in the material of ring 22. The inner peripheral limits of the outer band 23 are fixed to the reinforcing ring 24 at spaced locations 25. The outer peripheral extremities of the corrugated bands 23 are in line-contacting abutment at 27 with the inner abutment surface of the outer conduit or casing 11. This construction provides additional air insulating spaces 28 between the pipe support and the casing 11.

In FIGURE 3 the outer reinforcing ring means takes the form of an annular ring 30 which serves the purpose of both the reinforcing ring 24 and the outer band 23 of the embodiment of FIGURE 2. The ring 30 provides an outer abutment surface which is in spaced supporting abutment at 32 with inner abutment surface 33 of a corrugated casing 11'.

As has been described, the passages 20 provide substantially annular insulating pockets of air around the pipe 10. Air is a better insulating material than are filler materials which have the required inherent strength to support the pipe and, therefore, the assembly consisting of bands 15, 16 and 17 previously described may be used to form this inner surface of the insulating, pipe-supporting filler material 22. At the same time, the use of a ring of insulating material 22 provides a uniform insulation around the band 16. Therefore, that small amount of energy which is conducted by the supporting member 17 is substantially uniformly insulated by the insulating material 22, and localized hot spots are prevented. The air and filling material coact together to provide an overall outstanding result and maintain the outer casing substantially completely insulated from the inner pipe 10.

Further, the substantially annular ring of air surrounding the pipe 10 and disposed between the ring 22 and the pipe permits the use of very inexpensive, easy-to-handle materials to form the ring 22. Accordingly, a simplified support is provided which is simple to manufacture and highly efficient.

While the invention has been described with detail, it is believed that it essentially comprises a conduit system having a pipe and a casing surrounding the pipe, a plurality of spaced pipe supports disposed within the conduit, a ring of insulating filling material, and means forming substantially a ring of insulating air between the ring of insulating material and the pipe.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a conduit, an outer casing surrounding the conduit and spaced therefrom, and a plurality of conduit supports, each such conduit support comprising an annular body having walls defining a through passage in peripheral supporting abutment with said conduit; each of said bodies including a ring of substantially solid, weight supporting, filling and insulating material; each such body also having peripheral reinforcing ring means including an annular reinforcing ring supporting the filling and insulating material, the ring means also including a peripheral abutment surface, said casing including an inner wall forming an abutment surface; said abutment surfaces being engaged in regions of circumferentially spaced, conduit supporting, line contact abutment, and at least one of said abutment surfaces being of corrugated cross section with recesses between said regions of circumferentially spaced line contact abutment to provide spaced air circulating passages, there being one passage between adjacent regions of line contact abutment, and each such body including an annular air insulation portion disposed within and spaced from the ring means, each such insulation portion including at least one reinforcing band and a corrugated band secured to said reinforcing band at spaced locations.

2. In a conduit system having a pipe and a casing surrounding and spaced from the pipe, the combination of, a plurality of spaced pipe supports disposed within the conduit and the surrounding pipe to maintain the two spaced from one another, each of said supports comprising, a first inner annular band in circumscribing supporting abutment with the pipe, a second annular band concentric with and spaced from the first band, a corrugated band connected to the first and second bands and maintaining them in spaced relationship, an endless ring of weight supporting, molded, filling and insulating material surrounding and fixed to the second band, and an endless band circumscribing the ring and secured thereto.

3. The device of claim 2 wherein the endless band is corrugated and wherein a reinforcing annulus is embedded in the ring and fixed to the endless band at circumferentially spaced locations.

4. In combination:
   (a) a pipe;
   (b) a casing surrounding the pipe in spaced relationship therewith; and,
   (c) a plurality of spacers each between the pipe and casing and maintaining the pipe and casing in spaced relationship, each of said spacers comprising:
      (i) first and second endless reinforcement bands positioned one within the other and in spaced relationship;
      (ii) an endless molded structure of weight supporting, filling, and insulating material positioned between and secured to the first and second bands;
      (iii) a corrugated band secured to said first reinforcement band at spaced locations on a side of one first band radially opposite the structure;
      (iv) a first support ring secured to the corrugated band at spaced locations whereby said first band, said corrugated band, and said first support ring substantially define an endless insulating space;
      (v) said second reinforcement band being a second support ring; and,
      (vi) one of the support rings abutting the pipe and the other of the support rings abutting the casing.

References Cited in the file of this patent
UNITED STATES PATENTS

| | | |
|---|---|---|
| 504,397 | Marsh | Sept. 5, 1893 |
| 1,930,285 | Robinson | Oct. 10, 1933 |
| 1,991,455 | Gottwald | Feb. 19, 1935 |
| 2,707,095 | Parsons et al. | Apr. 26, 1955 |
| 2,756,032 | Dowell | July 24, 1956 |
| 2,903,017 | Cotman | Sept. 8, 1959 |